Patented Oct. 17, 1944

2,360,382

UNITED STATES PATENT OFFICE 2,360,382

ZEIN-SHELLAC COMPOSITION AND METHOD OF PREPARING SAME

Harry M. Weber, West Englewood, N. J., assignor, by mesne assignments, to Prolamine Products Incorporated, Dover, Del., a corporation of Delaware No Drawing. Application December 23, 1938, Serial No. 247,367

11 Claims. (Cl. 106—152)

The present invention relates to a liquid coating and impregnating composition and to a solid composition obtained therefrom by evaporation of solvent, or obtained by thermoplastically incorporating together the two essential ingredients: shellac and zein. It has special reference to an inexpensive coating, impregnating or moldable composition having economic value greater than shellac, properties superior to shellac, and qualities enhancing the value of shellac alone, or zein alone. It has reference to a composition essentially of shellac and zein, which composition has thermo-setting properties akin to thermo-setting synthetic resins. In short, it is superior to shellac.

Shellac is a particularly valuable natural resin well known and long used. Shellac differs radically in its chemical properties from those of the rest of other natural resins. Its origin likewise differs, being the product of the lac insect, rather than a botanical product. The present invention utilizes these chemical properties in combination with a second essential ingredient. One of the valuable properties of shellac is its solubility in various solvents, particularly aqueous ethyl alcohol having about 5% water by volume (190 proof), which is the common alcohol of trade. Other valuable properties are the gloss of a coating formed from solution, the adherence to many surfaces, grease-proofness, and its transparency.

Shellac is a raw material of oriental origin and has certain properties which limit its uses. Supply and demand is a limiting factor. Even its common uses have disadvantages. For example, liquid coating compositions are tacky during the drying period because of retention of solvent. Shellac coatings are readily spotted by water, are easily scratched, and have variable cost.

By means of the present invention a product superior to shellac is obtained by the expedient of compounding it with zein. Such a composition eliminates the above cited disadvantages, and gives a composition useful like shellac, and useful in many other ways in which shellac is not useful. It has properties not inherent in shellac alone, or zein alone. For example, a mixed composition of this character dries non-tacky to the touch within a few minutes of its application. When dry, the combined materials present an increased toughness over shellac, in that where an ordinary shellac coating may be readily scratched with the finger nail, the new composition cannot be so scratched even though the nail be pressed with sufficient force to indent the composition. This increased toughness is valuable in coating of paper products that are later subjected to an embossing operation. The new composition as produced from drying a solution thereof, has a greater resistance than a shellac coating to spotting with water. When the new coating is baked at 50° C. or higher its resistance to spotting with water can be measured in hours instead of fractions of an hour as for shellac. Because of the limited supply of shellac, the plentiful protein effectively stretches the supply of shellac and gives better results from the shellac used, consequently is capable of leveling out the fluctuations of cost due to changes in supply and demand of shellac. In addition the combination of zein and shellac possesses relatively rapid heat-reactive qualities which neither zein nor shellac alone possess under the same conditions. This is of particular advantage in the preparation of cold molded products, which are baked to obtain thermal rigidity. Hot molded products may also be made under heat and pressure as with many well known plastics.

It is an object of the present invention to obtain the foregoing results by using with shellac a specific protein material called zein, a product readily available in large quantities.

Another object of the invention is to combine zein and shellac through the agency of a common solvent.

Still another object of the invention is to combine shellac and zein by thermal admixture, thus producing a thermo-plastic and thermo-setting mass.

Various other and ancillary objects and advantages of the invention will become apparent from the following description and explanation of the invention.

Zein is a protein material ordinarily containing up to 13% moisture, derived from corn gluten and is a member of a distinctive class of proteins called prolamines characterized by insolubility in water, insolubility in absolute monohydric alcohols, and solubility in aqueous mixtures of said alcohols. The aqueous alcohols defined as prolamine solvents are usually given in the literature as composed of 7% to 30% water by volume. It is also soluble in a mixture of anhydrous solvent components, which per se are non-solvents. Such solvent mixtures dissolving zein are solvents for shellac. Examples are: (a) 55 parts by weight of absolute ethyl alcohol, 24 parts by weight of toluene, and 21 parts by weight of Cellosolve, and (b) 70 parts by weight of absolute methyl alcohol and 30 parts by weight of toluol. There are many other solvent mixtures. It is a domestic product in the United States with a great potential supply of which the actual supply can be increased and cheapened with increased demand.

I have found that commercial zein with 7% water in particular is soluble in a stronger mixture than indicated generally in the literature, and in an aqueous alcohol having ethyl alcohol of about 95% by volume. I have found also that the upper limit of such alcohol in an aqueous alcohol solvent for zein slightly overlaps the lower limit of ethyl alcohol in an aqueous alcohol solvent for shellac. I have also found that mixtures of dry shellac and dry zein do readily and cleanly dissolve in aqueous alcohol whch will dissolve either one alone. I have found further that separate solutions of zein and of alcohol each having a solvent near 95% ethyl alcohol may be readily made and may then be mixed to form a clean solution of the zein and the shellac, without precipitation of either zein or shellac. In other words, the presence of shellac in alcohol makes that alcohol a better solvent for zein, it being noteworthy that a strong alcohol becomes a better zein solvent when diluted with some non-alcohol, whether it be a volatile or a non-volatile substance. Consequently, shellac may be dissolved in a higher strength alcohol solvent which will not dissolve the zein, and that zein may be dissolved in a more dilute alcohol solution which will not dissolve the shellac, and these different solutions may be mixed in limited proportion to provide a mutual solvent for each ingredient.

By this procedure a wide variety of liquid or viscous compositions may be made, having a varying ratio between zein and shellac, and a varying content of total solids. For example, the solvent content may vary from 30% to 90% or greater, and the solids from 70% to any lower dilution desired. In the solid content of a solution, for example, either the shellac or the zein may vary from about 15% to about 85%.

I have also found that plasticizers and other modifying agents may be dissolved in such solutions, or fillers, color, or pigments be added to give more valuable properties to the composition. Suitable plasticizers may be added, for example, to the extent of about 10% or higher to about 75% of the solid content of zein-plus-shellac, the effectiveness of any given quantity varying with the composition in zein and shellac. Such plasticizers are dibutyl tartrate, dibutyl phthalate, triacetin, aromatic and aliphatic sulfonamides (including "Santicizer 8"), and other well known ones commonly used in shellac, prolamine-base compositions, or other base compositions which are commonly deposited from volatile organic solvents.

The permitted deviations of the alcohol-water solvent from the 95% alcohol basis is dependent upon various factors, such as the desired concentration of zein or shellac, or both, and such as the temperature used in drying the coating. It is therefore not capable of exact definition except by prescription of details which may readily be determined by those skilled in the art. Where 190 proof alcohol is used under ordinary conditions, no difficulty is encountered in arriving at solutions within the broad ranges above set forth. The more one strengthens the alcohol, the less easily will the zein dissolve, and the less will be the capacity to dissolve zein, yet the more readily will shellac dissolve. The more one dilutes the 95% alcohol, the better it is as a solvent for zein and the poorer it is as a solvent for shellac.

Although one may use a 190 proof-plus alcohol solvent for dissolving the shellac, and a 190 proof-minus alcohol for dissolving the zein, and then mix the separate solutions, there can readily be encountered a critical point where at least one of the solutions is too concentrated for contact with the other solution on mixing, resulting in a precipitation which may require further time for dissolution after mixing. It is therefore preferred that in each case the same strength of alcohol be used to dissolve each ingredient separately.

While I have set forth 190 proof ethyl alcohol as a particular solvent for the mixed composition, I do not intend to convey the idea that it is the only mutual solvent. Other solvents may be used as above indicated. Others may be found. For the general uses of this coating composition a mutual solvent preferably must not only dissolve the composition, but it must permit formation of a solvent-free coating by evaporation in a reasonable length of time with a minimum of bad odor in the drying and a minimum of permanent solvent odor in the coating. Also such a mutual solvent for common uses should permit of a slight dilution with water, as in drying a film on a humid day, thus to permit a coat to be formed by the ordinary methods of application without blushing or spotting. I have found that 95% iso-propyl alcohol is one such other mutual solvent. Another such mutual solvent is aqueous ethyl "Cellosolve" (mono-ethyl ether of ethylene glycol) of from 80% to 95%.

The solutions, separate or mixed, are herein referred to as homogeneous or clear to indicate that the solution is a solution devoid of any essentially large quantity of undissolved soluble zein or shellac, and such reference is not to be understood as meaning total absence of added filler or pigment, or of cloudiness or suspensions of material which may be an impurity or a contamination of the zein or the shellac, such as perhaps a small fraction of denatured zein which is frequently found in commercial zein. The solid residue is likewise referred to as homogeneous to indicate that the zein and the shellac are mutually diluents of each other, and this does not exclude any turbidity or suspension of other matter, or of denatured zein, or of pigments or fillers that may be present.

I have found that the zein tempers the shellac and enhances the desirable qualities of pure shellac. The zein toughens the coat, thus eliminating an undesirable brittleness. The new composition is not so easily scratched as shellac. Where it is plasticized it is far superior to plasticized shellac for the latter has its tackiness during the drying period enhanced by use of plasticizer. The presence of zein offsets any tackiness which would otherwise be present due to the shellac or the admixture of it with plasticizer. The water-resistance is greatly improved over that of pure shellac. Therefore, products impregnated or coated with the new composition are more permanent and do not develop checking or peeling. Impregnated material such as paper, cloth, or shaped materials entering into shoes, hats, coats, furniture and the like, are far superior to those likewise treated with shellac, or glue or other cheap materials. Book-backs are less subject to cracking and flaking, than when made with glue or shellac, and when plasticizer is used in a zein-shellac composition for book-bindings or on or in other flexible structures, the product is superior and the composition is more economical to use than shellac, or glue or cheap resins. The composition is glossy for use in glazing paper book jackets, or covers, magazine covers, advertising sheets and the like, and in these uses its grease-proofness, water-resistance and non-tacky character permit retention of a clean gloss where there is considerable handling. Its transparency for impregnating to make transparentized papers, or for covering printed matter makes it especially valuable. Its odorless character makes it superior to most materials commonly used for these purposes.

Heretofore shellac has been toughened largely by use of cellulose esters which require solvents having a minimum or no water content. The present invention permits the preparation of such coating solutions, and such coating solutions do not present difficulties in evaporation of solvent to secure the desired residual solid composition.

With the 95% aqueous alcohol solvent for the zein-shellac composition a cheap single solvent is available and the solution evaporates with no difficulties at all to secure the desirable clear solid residue. In other words, the solution is non-blushing in application under ordinary conditions, and is superior to the well known liquid shellac which is the common variety that is not toughened by added cellulose ester.

The preferred solvent from the standpoint of cost is 95% aqueous ethyl alcohol, which of course may be denatured. This preference is not only for reasons given above, but also for convenience due to the fact that it is a well known solvent for shellac, and is the thinner used for shellac. It is thus possible to supply the raw material or various solutions of zein or zein and shellac, or a compound of zein and shellac, in such a way that a coating composition may be readily mixed and thinned by use of materials familiar to the ordinary user of shellac. As an example of the composition the following is given:

| | |
|---|---|
| 95% ethyl alcohol _____ gallon__ | 1 |
| Zein (7% moisture) _____ lbs__ | 2 |
| Shellac _____ lbs__ | 2 |
| Dibutyl tartrate _____ lb__ | 0.8 |

Preferably the zein is mixed with cold 95% alcohol (ethyl alcohol denatured with about 5% methanol) and then heated to about 125° F. to effect solution. The shellac may be treated in the same way. However, about two-thirds of the alcohol of the formula is used for the zein, and the remainder is used for the shellac, because zein forms a more viscous solution than shellac. Then the two solutions are mixed. The plasticizer may be in either or both solutions before mixing, or may be added after mixing. This solution may be used to form a priming coat on furniture.

Another example shows a more dilute solution, which can be made by cutting a stronger solution with ordinary grain or denatured alcohol.

| | |
|---|---|
| 95% ethyl alcohol _____ gallon__ | 1 |
| Zein (7% moisture) _____ lb__ | .75 |
| Shellac _____ lb__ | .75 |
| "Santicizer 8" _____ lb__ | .18 |

This solution is ideal for use on printed paper sheets used as protective jackets for the fly-covers of books. These are usually printed on one day and shellac-coated on the next. Oxidation of oils in certain printing inks often creates heat in stacks of shellacked printed sheets and this frequently causes sticking within the stack. Use of the above composition prevents such sticking. The heat hardens the coat.

The above description of the preferred methods of practicing the invention are given as exemplary only, and are not to be construed as limitations. For example, various denatured ethyl alcohols of about 95% strength may be used. Further, it is not necessary that the solution of either ingredient be made by dissolving the ingredient itself from a solid form. The important point is that a solution is available, whether made up specially, or taken from other sources, as for example, from a process of extraction, or purification of the ingredient.

The foregoing relates to but one phase of the invention wherein the new composition has a form, usage and manipulation comparable to shellac solutions. However, the zein and shellac resulting from the drying of a solution is not the only form of the new compound. It is well known that shellac may be softened by heat, and I have discovered that this softened shellac is a good solvent for zein. Consequently zein and shellac may be combined apart from the use of a mutual solvent. I have also discovered that the combination of zein and shellac is heat-reactive to harden. Thus the films deposited from solutions above referred to may be improved by baking or upon long standing at lower temperatures. This tendency to react and harden places limitations upon any thermal process of incorporating zein and shellac, but there is no great handicap to be overcome.

The zein and the shellac may be combined by thermal working. Heat-softened plastic shellac may be worked with zein in powder or other form to dissolve the zein. The working is preferably done on rolls heated by 50 lb. steam pressure. The addition of small amounts (up to 20% of total solids) of aqueous alcohol (95% alcohol) facilitates the mutual incorporation at lower temperatures, thus retarding the reaction of the components as a thermo-setting mass. The incorporation by steam rolls may be completed in from 10 to 15 minutes, during which time the total thermal-setting property is not expended. Thus, within this, and within longer times, a plastic mixture may be taken from the rolls and cooled, which mixture is subject to thermo-setting on further heating for a prolonged period. Likewise, the deposit from a solution of zein and shellac is subject to setting by thermal action by exposure to heat. A coated article with a film deposited from solution may be completely baked in 2 hours at from 50° C. to 100° C.

Various ways of molding the product may be employed. For example the hot mixture from the mixing rolls may be molded while hot and then baked. If such discharged hot masses are sufficiently large the residual heat will effect the baking. Molding of the freshly mixed composition shortens the baking period. A cooled thermally blended mixture may be ground to a powder, which powder may be molded cold or hot and baked whereby it integrates. When powder is cold molded a small amount of solvent, such as 95% aqueous alcohol is preferably employed.

For thermal blending the zein-shellac may comprise from 10% to 75%. Likewise, solutions may have from 10 parts or more of zein to 90 parts of shellac, up to 75 parts of zein to 25 parts of shellac. However, as stated above the zein content, or the shellac content may vary from 15% to 85% of the total zein and shellac, where the solution is designed for coating and impregnating, in the usages where shellac alone is commonly used.

Plasticizer may be used in the thermally mixed composition and be incorporated into the shellac along with the zein. Plasticizer may be used up to 40% of the total of zein and shellac. However, plasticizer is not extremely necessary in a molded product. The brittleness of shellac per se is lost by the toughening action of the zein, and the thermo-setting does not destroy the tough character of the compound.

The invention is of course not limited to or by the disclosures herein made, and many changes and modifications are contemplated as falling within the scope of the invention as set forth in the appended claims.

This application is a continuation in part of my copending application Serial No. 124,461, filed February 6, 1937.

I claim:

1. The method of making a thermo-setting solid composition which comprises dissolving zein in heat-softened shellac.

2. The method of making a thermo-setting composition which comprises mutually incorporating shellac and zein by solution in a volatile mutual solvent, evaporating the solvent to provide a shellac-zein residue, and heating the residue to soften the shellac therein whereby to effect solution of the zein in the shellac, said resulting mass being subject to a hardening by continuation of the heat, by reaction between the zein and the shellac.

3. The method of making a thermo-setting composition which comprises mutually incorporating shellac and zein by softening shellac with heat, and working zein into the softened shellac until the zein is dissolved therein, whereby further heating of the compound effects loss of thermoplasticity by a thermo-setting action.

4. The method of making a thermo-setting composition which comprises mutually incorporating shellac and zein by softening shellac with heat, working zein into the softened shellac until the zein is dissolved therein, whereby further heating of the compound effects loss of thermoplasticity by a thermo-setting action, and cooling the thermo-plastic mass.

5. The method of making a molded article essentially of shellac and zein, which comprises dissolving zein in hot plastic shellac, shaping the thermo-plastic product, and subjecting the shaped product to the action of heat to harden the product.

6. The method of making a molded article essentially of shellac and zein, which comprises dissolving zein in hot plastic shellac, cooling the resulting thermo-plastic mass, finely dividing the cooled mass, shaping the finely divided mass, and subjecting the shaped mass to the action of heat to integrate and harden it.

7. The method of making a thermo-setting composition which comprises mixing a heat-plasticized mass of shellac and zein in the presence of a moistening mutual solvent until the zein is dissolved in the shellac to form a thermo-plastic mass, the presence of the solvent effecting mutual incorporation at a reduced temperature, whereby the hardening action of heat during the mixing operation is lessened.

8. The method of making a thermo-rigid composition which comprises incorporating shellac and zein together to provide an incompletely thermally reacted mass, moistening a finely divided form of said mass with a mutual solvent, shaping the moistened mass, and applying heat to harden the mass.

9. The method of making a thermo-setting molding powder, which comprises combining shellac and zein to a solid homogeneous mass, and powdering the mass.

10. The method of making a thermo-setting molding powder which comprises thermally blending zein and shellac, cooling the blended mass, and powdering the cooled mass.

11. The method of making a hardened composition containing shellac which comprises mutually incorporating shellac and zein by solution in a volatile mutual solvent, evaporating the solvent to provide a shellac-zein residue, heating the residue to soften the shellac whereby to effect solution of the zein in the shellac, and after solution of the zein in the shellac heating the resulting solution for a prolonged period whereby to effect a hardening by reaction between the zein and the shellac.

HARRY M. WEBER.